(12) United States Patent
Hildstad et al.

(10) Patent No.: US 7,594,779 B2
(45) Date of Patent: Sep. 29, 2009

(54) BOTTOM FED SCREENED WATER DIVERSION APPARATUS

(75) Inventors: Tod A. Hildstad, Hood River, OR (US); Timothy T. Annala, Hood River, OR (US)

(73) Assignee: Farmers Irrigation District, Hood River, OR (US)

( * ) Notice: Subject to any disclaimer, the term of this patent is extended or adjusted under 35 U.S.C. 154(b) by 0 days.

(21) Appl. No.: 10/391,517

(22) Filed: Mar. 17, 2003

(65) Prior Publication Data

US 2003/0219311 A1    Nov. 27, 2003

Related U.S. Application Data

(60) Provisional application No. 60/364,824, filed on Mar. 15, 2002.

(51) Int. Cl.
*E02B 8/08* (2006.01)
(52) U.S. Cl. .......................... 405/81; 119/219
(58) Field of Classification Search ................. 119/219; 405/80–83; 210/162, 170, 747, 767
See application file for complete search history.

(56) References Cited

U.S. PATENT DOCUMENTS

| | | | |
|---|---|---|---|
| 1,825,169 A * | 9/1931 | Wyckoff | 210/154 |
| 2,826,897 A | 3/1958 | Vinsohnhaler et al. | |
| 3,377,805 A | 4/1968 | Warner | |
| 4,169,057 A * | 9/1979 | Gideon | 210/236 |
| 4,260,286 A | 4/1981 | Buchanan | |
| 4,437,431 A | 3/1984 | Koch | |
| 4,526,494 A * | 7/1985 | Eicher | 405/83 |
| 4,629,361 A | 12/1986 | Zimmerman | |
| 4,740,105 A | 4/1988 | Wollander | |
| 5,161,913 A | 11/1992 | Boylan | |
| 5,263,833 A | 11/1993 | Robinson et al. | |
| 5,308,192 A * | 5/1994 | Srackangast | 405/184.1 |
| 5,385,428 A | 1/1995 | Taft, 3rd et al. | |
| 5,543,038 A * | 8/1996 | Johannessen | 210/117 |
| 5,779,888 A * | 7/1998 | Bennett | 210/162 |
| 6,132,626 A | 10/2000 | Hart | |
| 6,524,028 B2 * | 2/2003 | Bryan | 405/81 |

FOREIGN PATENT DOCUMENTS

| | | | |
|---|---|---|---|
| CA | 2211841 | * | 2/1998 |
| DE | 2743580 | * | 3/1979 |
| DE | 3001640 | * | 9/1980 |
| GB | 2315684 | * | 2/1998 |
| JP | 61-53909 | * | 3/1986 |
| WO | 0358952 | * | 8/1989 |
| WO | 97/06872 | * | 2/1997 |
| WO | 98/31882 | * | 7/1998 |

* cited by examiner

*Primary Examiner*—Sunil Singh
(74) *Attorney, Agent, or Firm*—Steven J. Adamson

(57) ABSTRACT

A fish-safe screened water diversion apparatus having an input and diverted and non-diverted outputs. Water or other fluid is directed substantially downward under the screen at the input and preferably flows under the screen in a substantially unimpeded manner to the non-diverted output or substantially upwardly and/or diagonally through the screen to the diverted output. Various diversion apparatus and screen embodiments are disclosed.

22 Claims, 4 Drawing Sheets

BOTTOM FED SCREENED WATER DIVERSION APPARATUS

CROSS REFERENCE TO RELATED APPLICATIONS

This application claims the benefit of U.S. Provisional Application No. 60/364,824, filed Mar. 15, 2002, and having the same title and inventor(s) as above.

FIELD OF THE INVENTION

The present invention relates to water diversion devices and, more specifically, to in-stream or out-of-stream devices that provide a screen to retains fish, particularly migrating juvenile salmonids, in a non-diverted out flow stream.

BACKGROUND OF THE INVENTION

The diversion of water from streams and rivers has been an integral part of the development of the industrial and agricultural economies of the Pacific Northwest and other regions. This diverted water has ground grain, generated electric energy, irrigated arid lands, and been used for municipal water supplies and industrial purposes. Typically, the diversions are not screened, resulting in the ready movement of fish from the source streams into diverted water flows and ultimately to their death. In the Pacific Northwest, unscreened water diversions, amongst other causes, have resulted in the extinction of steelhead and salmon from over 50% of their historic range and have dramatically reduced salmon populations in the few remaining rivers and streams that support salmon. In addition, several races of Pacific Northwest salmonid species have gone extinct and several others are now listed as threatened or endangered.

During the development of irrigation and hydroelectric facilities, efforts have been made to achieve screened water diversion apparatuses that separate fish and/or debris from the diverted water flow. Generally speaking, these devices have not worked well and for that reason they are rarely used even though required by law in some instances. For example, in its 1996 study of Pacific Northwest salmon, the National Research Council reported that fewer than 1,000 of the 55,000 water diversions in Oregon were screened, and 3,240 were listed as a high priority for screening.

Representative fish screen embodiments are shown in U.S. Pat. Nos. 3,938,340 and 4,064,048, issued to Downs and U.S. Pat. No. 4,740,105, issued to Wollander. A common feature of these devices is that the fish screens are arranged substantially vertically. A significant problem with vertically arranged screens is that they are easily fouled or clogged, resulting in burdensome cleaning schedules or elaborate cleaning equipment that is of questionable efficacy (see, for example, the '105 patent).

Other screen arrangements are discussed in U.S. Pat. Nos. 4,526,494 and 5,385,428 issued to Eicher and Taft, respectively. These arrangements each employ a submerged diagonally disposed screen that slopes upwardly in the downstream direction. The diagonal screen arrangement promotes rapid movement of water through the screen and, in principal, generates a shear force that pushes smolt up the screen to a bypass mechanism. The rapid movement of water through the screen, however, causes debris and fish (particularly juvenile salmonid species) to be driven into or accumulated at the screen, thus leading to fouling and fish loss. The screens of both the '494 and '428 patents are pivotally mounted for flushing this debris off the screens. In practice, the screens have also required additional cleaning and maintenance.

It should also be recognized that the devices of the '494 and '428 patents are for major hydroelectric installations which tend to pass large volumes of water and be much better capitalized than agricultural irrigation districts and the like. The devices of the '494 and '428 patents tend to be prohibitively expensive for low profit margin and non tax or rate payer supported installations such as agricultural fields and rural residential uses, etc.

U.S. Pat. No. 6,132,626 issued to Hart for a Liquid Filter teaches a filtration unit that back flushes a screening element when it becomes blinded by solid material. The device of the '626 patent does not provided unimpeded flow past the screen, but rather forces all flow through the screen, except when operating in back flush mode.

It should further be recognized that the above-described screened water diversions do not approximate natural conditions, and thus they increase both physical stress on fish and fish mortality. For example, the '340 and '048 patents use a mechanical scoop that collects fish and drops them into a return conduit, while the '105 patent uses fish traps and a tubal transport system. Similarly, the '494 and '428 patents teach submerged conduits that use high velocity water flow through a tilted screen to shear fish off towards a bypass conduit. The '626 patent teaches a closed chamber that traps or pins fish on a screen, subsequently opening a trap door when the movement of pinned fish or other debris is sufficient to prevent fluid passage and activate a release mechanism. These are all unnatural stream features and work against the genetic programming of fish, leading to increase stress, injury and mortality.

A need thus exists for a screened water diversion that safely and efficaciously maintains fish in the non-diverted flow. A need also exists for such a screen diversion that approximates natural conditions, is substantially non-fouling, and is easy-to-use and low cost to implement and maintain.

In addition, a need exists for such a screened water diversion that embodies one or more of the following aspects: eliminates risk of predation of fish, is not susceptible to a "dry-screen" condition, ensures adequate water depth for passage and greatly minimizes or eliminates risk of screen plugging from sediment, among other aspects.

SUMMARY OF THE INVENTION

Accordingly, the present invention provides a screened water diversion that utilizes a submerged screen and overcomes the problems of the prior art. In one embodiment, the present invention includes an input that directs fluid flow downward to a non-diverted passage under a screen. A weir or related item may be provided past the screen to maintain the screen in a substantially submerged condition, though safe fish passage is achieved without this item. If sufficient flows are present, fluid flows both under the screen to the non-diverted output and upward through the screen into a diverted output.

This and related embodiments provide many benefits. These benefits include, but are not limited to, providing adequate water for fish, even in low flows; not impeding the timing of fish migration; shielding fish from predators (birds, mammals, etc.) as they pass the screen; significantly reducing the likelihood of sediment lodging in the screen; and providing a potentially smaller screen footprint.

These and related objects of the present invention are achieved by use of a bottom fed screened water diversion apparatus as described herein.

The attainment of the foregoing and related advantages and features of the invention should be more readily apparent to those skilled in the art, after review of the following more detailed description of the invention taken together with the drawings.

DETAILED DESCRIPTION

Figure 1:
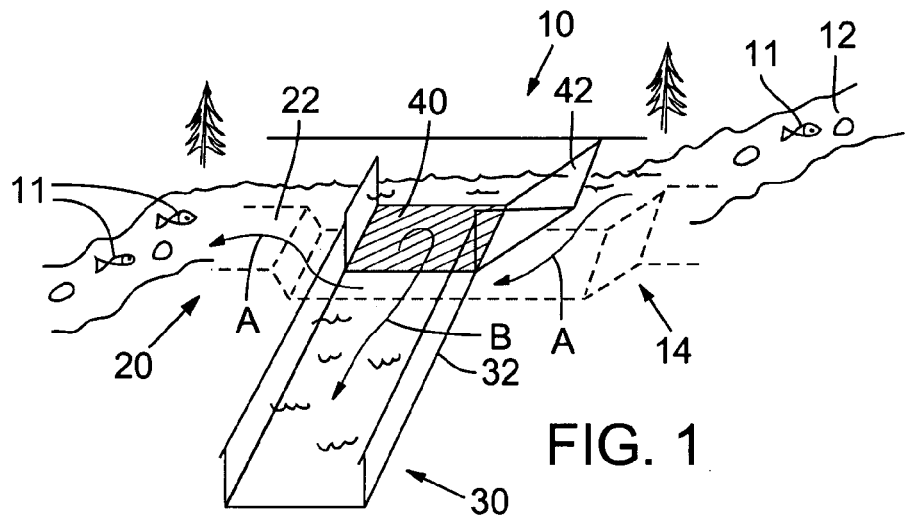
FIG. 1 is a perspective view of a screened water diversion device in accordance with the present invention.

Referring to FIG. 1, a perspective view of a screened water diversion device in accordance with the present invention is shown. FIG. 1 illustrates an input flow 12 from a stream, canal or other fluid conduit that contains migrating fish 11, such as juvenile salmonids. The fish are shown facing upstream even though they are descending because salmonids generally face upstream during descent, letting the flow of the water carry them down stream. Input flow 12 flows into an input 14 of device 10 and is split between a non-diverted output 20 and a diverted output 30. Arrow A indicates the non-diverted flow under screen 40, while arrow B indicates the diverted flow up through and away from screen 40. The non-diverted flow continues in the stream while the diverted flow may be channeled into a canal 32 or like structure for subsequent irrigation, power generation, or municipal or industrial use, etc.

Device 10 of FIG. 1 may include a ramp or funnel wall 42 that directs fluid at input 14 down under screen 40. A weir or other mechanism may be provided in the non-diverted flow downstream of the screen and positioned at an appropriate height to permit fish passage at low flows, but to allow diversion through screen 40 only when flow levels are adequate.

Figure 2:
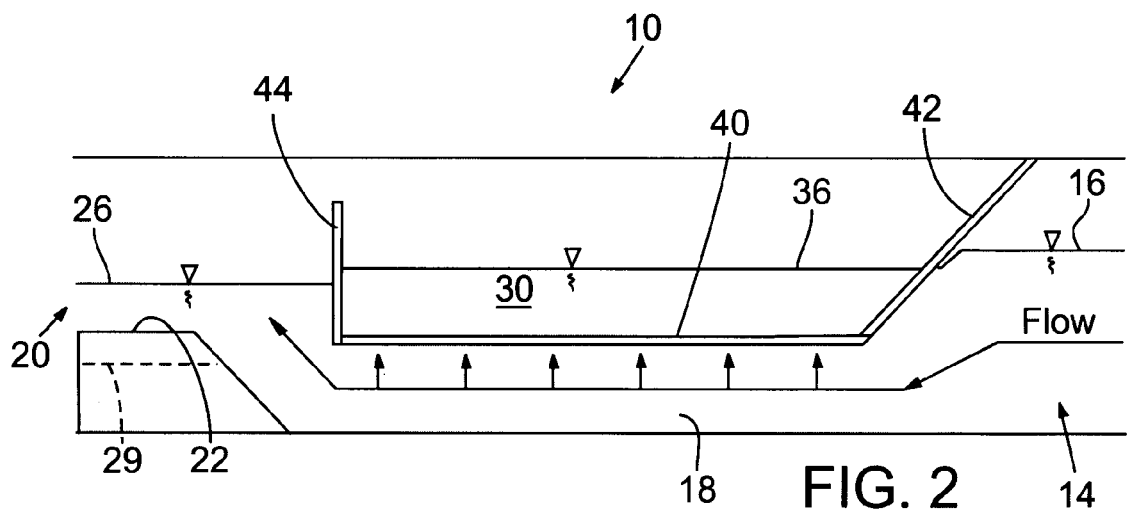
FIGS. 2–3 are a side view and a back view, respectively, of the device of FIG. 1.

Referring to FIG. 2, a longitudinal side view of device 10 of FIG. 1 in use is shown. While flow may vary, line 16 is a representative input flow level. This flow at least in part contacts funnel wall 42 from which it is directed downward into an under screen passage 18. A portion of fluid entering passage 18 flows through to non-diverted output 20. Another portion flows upward through screen 40, due to the upstream pressure gradient on fluid at the input. Line 36 is a representative diverted flow level for an input flow level as indicated by line 16.

Flow conditions below, yet near, screen 40 will tend to be more turbulent than lower down in passage 18. This facilitates passage of juvenile salmonids who will naturally tend to avoid turbulence in favor of a more pronounced downstream flow. Juvenile salmonids also tend to swim lower in a water column when stressed, further increasing the likelihood of successful passage through the screened fluid diversion device of the present invention. Note also that device 10 (and other devices herein) are preferably configured such that the flow of fluid under the screen is more rapid than an average flow rate upward through said screen, thereby passing and not "pinning" fish.

Non-diverted output 20 may include a mechanism 22 (weir or other) to determine a flow level relative to screen 40. This may be a physical characteristic of the site in which the screen is installed. The height of weir 22 may vary. If the top of weir 22 is positioned sufficiently below screen 40, then low flow levels will provide fish passage, but no diverted output. If the top of weir 22 is near or above screen 40, then low flow levels will provide low diverted flows and no non-diverted flow. Adjusting weir height provides a management tool for users. Weir height may be modified based on climate, hydrologic, or fish priority considerations. Note that in FIG. 2 line 26 is a representative non-diverted flow level given an input flow level at line 16.

Figure 3:
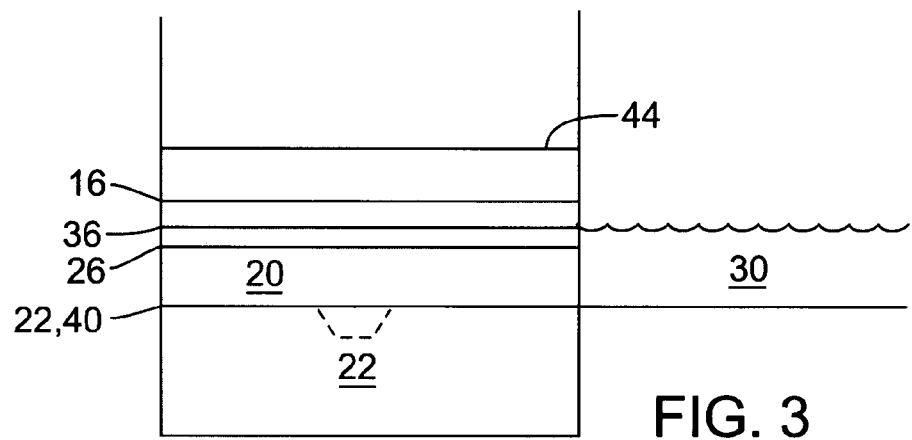

Referring to FIG. 3, a back view of device 10 of FIG. 2 is shown. FIG. 3 illustrates the top of weir 22 being at the same level as screen 40. Note that this arrangement may vary as discussed above. FIG. 3 illustrates the relative levels of the input, diverted and non-diverted flows 16,36,26, the top of end wall 44 and the non-diverted and diverted outputs 20,30. FIG. 3 also illustrates a low flow channel 29 (shown in phantom lines) that may optionally be provided in weir 22. This channel is also shown in FIG. 2. A low flow channel or the like may be provided if, for example, it is anticipated that flows may be significantly reduced during certain periods of the year.

Figure 4:
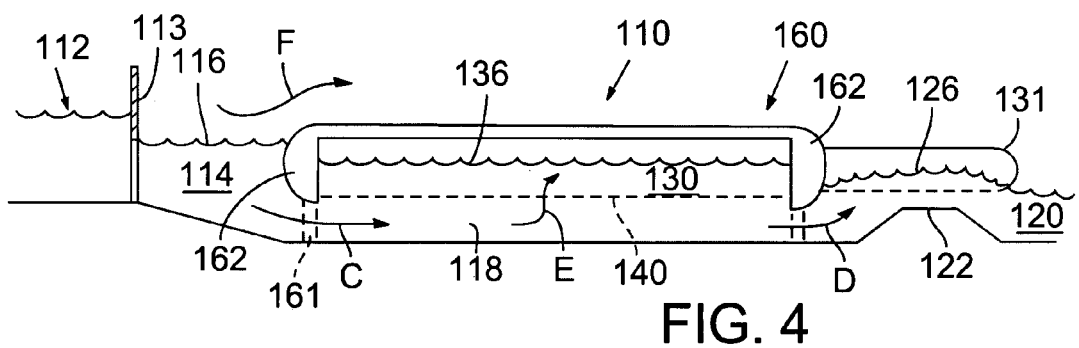
FIGS. 4–5 are a side view and a top view, respectively, of another embodiment of a screened water diversion device in accordance with the present invention.
Figure 5:
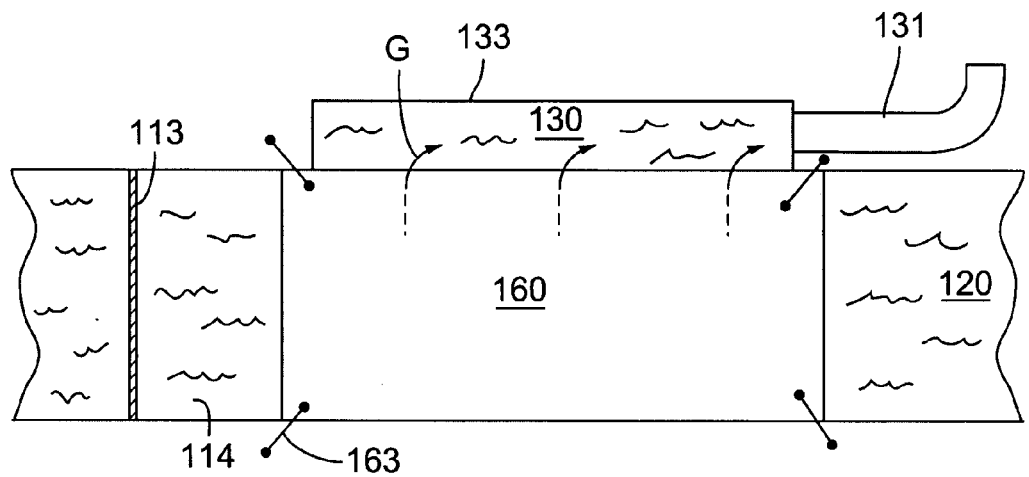

Referring to FIGS. 4–5, a side view and a top view of another embodiment of a screened water diversion 110 in accordance with the present invention are respectively shown. Fluid enters via stream 112. A head gate 113 may be provided to achieve a desired flow level into screened diversion 110 or for other fluid control purposes. Fluid at input 114 passes in the direction of arrow C under a screened diversion structure 160. High fluid levels or "overflow" may pass over structure 160 in the direction of arrow F.

Fluid flowing in the direction of arrow C flows into an under screen passage section 118 from which it passes to a non-diverted output 120, indicated by arrow D, or through screen 140 to a diverted output 130, indicated by arrow E.

FIG. 5 illustrates that fluid passing upward through screen 140 flows into a diverted flow receiving chamber or reservoir 133, indicated by arrow G, from which it may pass into a diverted flow conduit or like diverted flow output channel 131 (also shown in FIG. 4).

Structure 160 may be formed in a plurality of suitable materials including, but not limited to, wood, metal and/or plastic. Structure 160 may be fixedly mounted or moveably mounted in place. A moveable mounting scenario may include a floating arrangement or an arrangement with adjustable height legs or the like. In a floating arrangement, cables or the like 163 (shown in FIG. 5) or another attachment mechanism may be used to tether or anchor structure 160 in a desired position. In an adjustable height arrangement, legs 161 may include a positioning gear with turnable handle or have telescoping segments that are releasably set at a desired level. Note that structure 160 preferably includes upstream and downstream contouring 162, for example, a curved structure, that reduces flow turbulence.

FIG. 4 shows respective fluid flow levels for the input 116, diverted 136 and non-diverted 126 flows.

In the embodiment of FIGS. 4–5, either the height of screen 140 or the height of the weir (or like) 122 may be varied to adjust non-diverted and diverted fluid flows as discussed above. It should be recognized that screens 40,140 and structure 160 protects fish from predators while passing through the diversion device. The position of the weir relative to the screen permits fish to pass even at low flow levels. Since the input flow passes under the screen, sediment in the input flow does not foul the screen.

While the device 10,110 may be built to any suitable or desired dimensions, which may vary depending on site conditions and passage priorities, in at least one embodiment, the height of the under screen passage is less than the width. For example, FIGS. 1–2, 4–5, 6–7 and 8–9 illustrate embodiments in which the under screen passage has an average width that is greater than its average height. Also, in some embodiments of the present invention, the surface area of the screen is greater than the cross-sectional area of the under screen passage. The present invention, however, is not limited to these embodiments. For example, the under screen passage, may be configured as a deeper "pool" in which fish may rest. Pools typically hold cooler water at the bottom which is generally favored by juvenile salmonids (elevated water temperature is one, of the leading causes of salmonid fatality).

Figure 6:
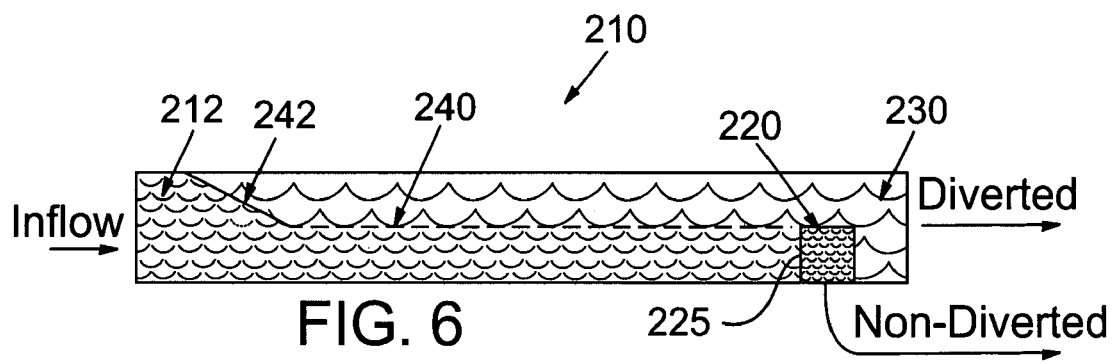
FIGS. 6–7 are a side view and a top view, respectively, of another screened water diversion device in accordance with the present invention.
Figure 7:
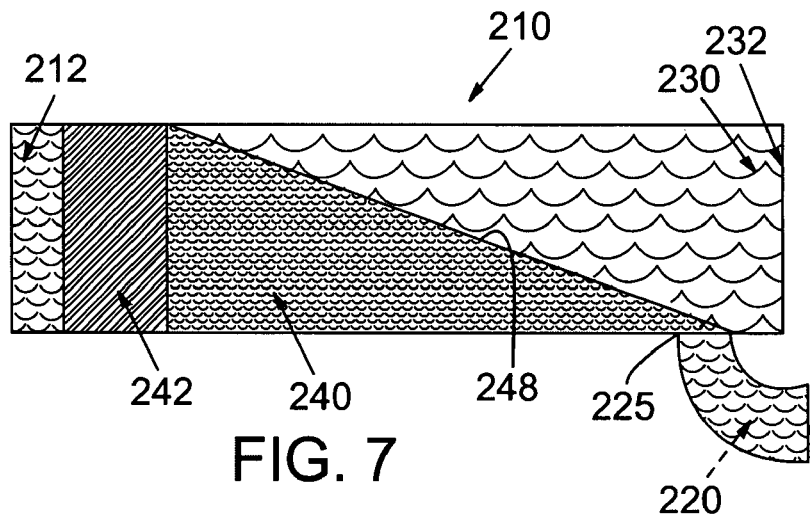

Referring to FIGS. 6 and 7, a side view and a plan view of another embodiment of a screened water diversion 210 in accordance with the present invention are respectively shown. FIGS. 6 and 7 illustrate an input flow 212, a funnel wall 242, a screen 240, a non-diverted output flow 220 and a diverted output flow 230. These components function or perform in a manner similar to their corresponding components in other embodiments discussed herein.

FIG. 7 illustrates that screen 240 may taper from the input towards the non-diverted output and be bordered by a wall or weir 248. This taper may accommodate for fluid lost to the diverted output canal 232, and wall 248 may channel fish towards non-diverted output opening 225. While one embodiment of opening 225 is shown in FIGS. 6–7, is should be recognized that many embodiments are possible, including larger and smaller openings, without deviating from the present invention. Device 210 of FIGS. 6–7, like the other embodiments herein, is designed to move fish rapidly and safely through the screened diversion device to the non-diverted opening.

Figure 8:
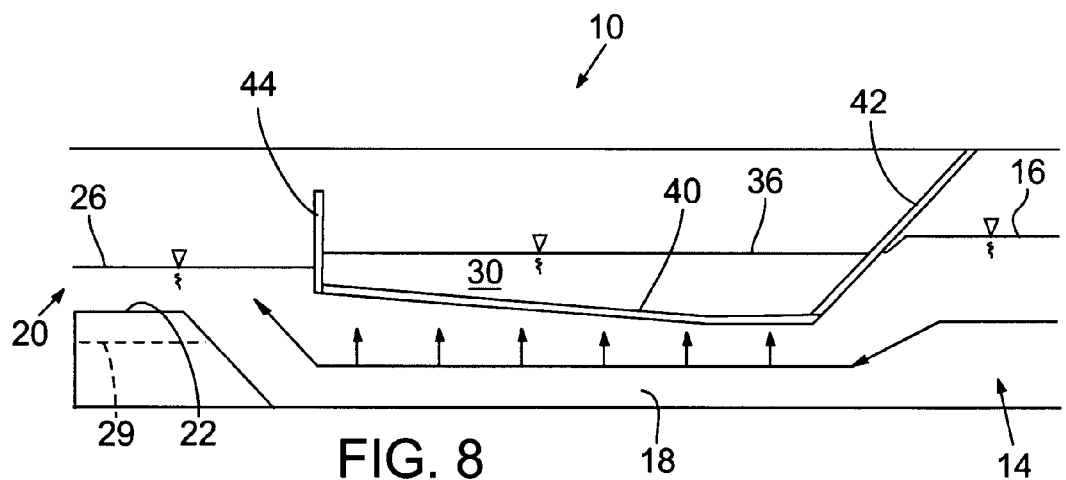
FIGS. 8–9 are alternative screen arrangements in accordance with the present invention.
Figure 9:
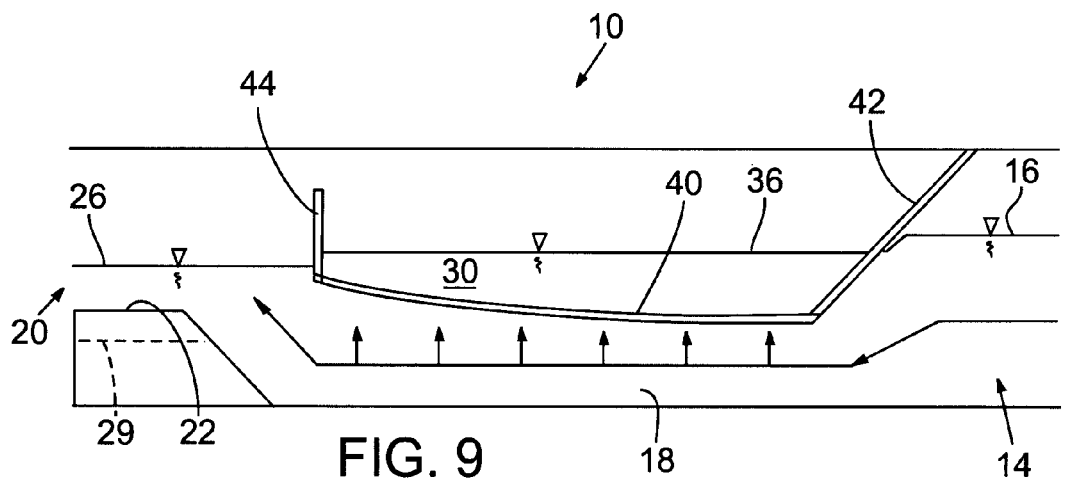

Referring to FIGS. 8–9, alternative screen arrangements in accordance with the present invention are shown. FIG. 8 illustrates screened device 10 of FIGS. 1–3, but with a screen 40 that is angled up towards the non-diverted output 20. This feature may facilitate movement of debris, particularly floating debris, past the screen towards the non-diverted output rather than impinging on and clogging the screen. While the angle shown is approximately 5–6 degrees, it should be recognized that the angle may be greater, for example, 10 or 20 degrees and even approaching approximately 30, 40 or 50 degrees. The screen may be angled in whole or in part.

FIG. 9 illustrates an embodiment in which screen 40 is curved upward towards the non-diverted output. The screen of FIG. 9 is intended to provide the same or similar function of the screen of FIG. 8.

The angled up or curved up screens also permit greater access to the under screen passage for cleaning out sediment, etc.

Note that devices 10,110,210 may be provided such that the screen is removably coupled, e.g., pivotally coupled, floating, wholly releasable, etc., from its support structure to provide access for cleaning, maintenance or other purposes. In the embodiment of FIGS. 1–3, for example, screen 40 may be pivotally coupled to the funnel wall an configured to releasably seat in a mounting bracket at the bottom of the end wall 44. Similarly, in FIGS. 6–7, the screen may be pivotally coupled (or releasably coupled) to the sidewalls or taper wall 248.

It is apparent from FIGS. 1–5 and 8–9 that devices 10,110 may provide an under screen pool that holds water after temporary cessation of flow at inputs 14,114 as may occur between rain showers or at other low precipitation or low flow conditions, particularly in the salmon reproduction areas of the Pacific Northwest.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A fish-safe water diversion apparatus, comprising:
an input, a non-diverted output and a diverted output;
a screen generally disposed in a configuration that is more horizontal than vertical and configured in said apparatus such that water entering said input flows substantially under said screen to said non-diverted output and substantially upwardly through said screen to said diverted output; and
an under screen passage chamber is defined on a lower portion thereof by a bottom and a surface ascending from the bottom, a downstream portion of the ascending surface being configured to convey fluid thereover to the non-diverted output and the point at which fluid is conveyed over the downstream portion of the ascending surface into the non-diverted output being above the bottom so as to create a survival pool over the bottom that is of sufficient depth to create a condition favorable to survival of juvenile salmonids;
wherein the path of water from said input through said under screen passage chamber to said non-diverted output is substantially unimpeded for unobstructed movement of fish from the input to the non-diverted output.

2. The apparatus of claim 1, wherein one of said input and said non-diverted output is at least in part uncovered to be directly exposed to outside air.

3. The apparatus of claim 2, wherein the other of said input and said non-diverted output is at least in part uncovered to be directly exposed to outside air.

4. The apparatus of claim 1, wherein said under screen passage chamber has a cross-sectional area substantially perpendicular to a primary line-of-flow therethrough that is greater at said input than at said non-diverted output.

5. The apparatus of claim 1, wherein said bottom and ascending surface include a threshold defining structure configured such that a level of fluid flow entering said apparatus must attain a threshold level before fluid flows through said screen and into said diverted output, the threshold defining structure further functioning to form the fish sanctuary pool at least in part under the screen by retaining fluid to a threshold depth that is sufficient for survival of juvenile salmonids when flow at the input alone is too low to create such a sanctuary pool.

6. The apparatus of claim 5, wherein said input upstream of said bottom and side wall structure has a bottom that is substantially at or above the level of said screen, and said apparatus further comprises a downward flow direction mechanism coupled upstream of said screen for directing flow from said input downward under the level of said screen.

7. The apparatus of claim 1, wherein the vertical cross-sectional surface area defined under said screen and in a plane substantially perpendicular to the non-diverted fluid flow for passage of the non-diverted flow is less than the surface area of said screen.

8. The apparatus of claim 1, wherein the height level of said screen at said input is lower than at said non-diverted output.

9. The apparatus of claim 1, wherein the ascending surface ascends from the bottom on all sides thereof.

10. The apparatus of claim 1, further comprising a screen support structure and wherein said screen is releasably movable relative to said screen support structure.

11. The apparatus of claim 1, wherein said screen is disposed in a substantially horizontal position.

12. The apparatus of claim 1, wherein the screen is provided in a floating arrangement.

13. A fish-safe water diversion apparatus, comprising:
an input, a non-diverted output and a diverted output;
a screen configured in said apparatus such that water entering said input flows substantially under said screen to said non-diverted output and substantially upwardly through said screen to said diverted output; and
a threshold defining structure configured such that a level of fluid flow entering said apparatus must attain a threshold level before fluid flows through said screen and into said diverted output, the threshold defining structure further functioning to form a fish sanctuary pool at least in part under the screen by retaining fluid to a threshold depth that is sufficient for survival of juvenile salmonids when flow at the input alone is too low to create such a sanctuary pool;
wherein the path of water from said input to said non-diverted output is substantially unimpeded for unobstructed movement of fish from the input to the non-diverted output.

14. The apparatus of claim 13, wherein said screen is provided in a floating arrangement.

15. The apparatus of claim 13, wherein one of said input and said non-diverted output is at least in part unenclosed so that the inside thereof is directly exposed to outside air.

16. The apparatus of claim 15, wherein the other of said input and said non-diverted output is at least in part unenclosed so that the inside thereof is directly exposed to outside air.

17. The apparatus of claim 13, wherein said input has a bottom that is substantially at or above the level of said screen, and said apparatus further comprises a downward flow direction mechanism coupled upstream of said screen for directing flow downward under the level of said screen at said input.

18. The apparatus of claim 13, wherein said fish sanctuary pool has a bottom that is substantially below a bottom of said input and substantially below a point of fluid passage to the non-diverted output of said threshold defining structure.

19. A fish-safe water diversion apparatus, comprising:
an input, a non-diverted output and a diverted output;
a screen; and
an under screen water passage chamber having a width and a height dimension in a vertical plane and being defined on a lower portion thereof by a bottom and wall structure that includes a downstream wall, said bottom and wall structure having a bottom that is below a bottom of said input and below the top of said downstream wall;
wherein said screen is configured such that water entering said input flows substantially under said screen to said non-diverted output and substantially upwardly through said screen to said diverted output;
wherein said bottom and wall structure is configured to create a pool at least in part under said screen that holds water after cessation of flow at said input, and said downstream wall defines a threshold level that water must attain before water flows through said screen and into said diverted output;
wherein the path of water from said input to said non-diverted output is substantially unimpeded for unobstructed movement of fish from the input to the non-diverted output; and
wherein the average width of said under screen water passage chamber is greater than the average height of that passage.

20. The apparatus of claim 19, wherein the screen is disposed in a substantially horizontal position.

21. The apparatus of claim 19, further comprising a screen support structure and wherein said screen is releasably movable relative to said screen support structure.

22. The apparatus of claim 19, wherein the screen is provided in a floating arrangement.

* * * * *